Dec. 5, 1933.     C. V. HALLENBECK     1,938,142
TRAILER
Filed Nov. 24, 1931     3 Sheets-Sheet 1
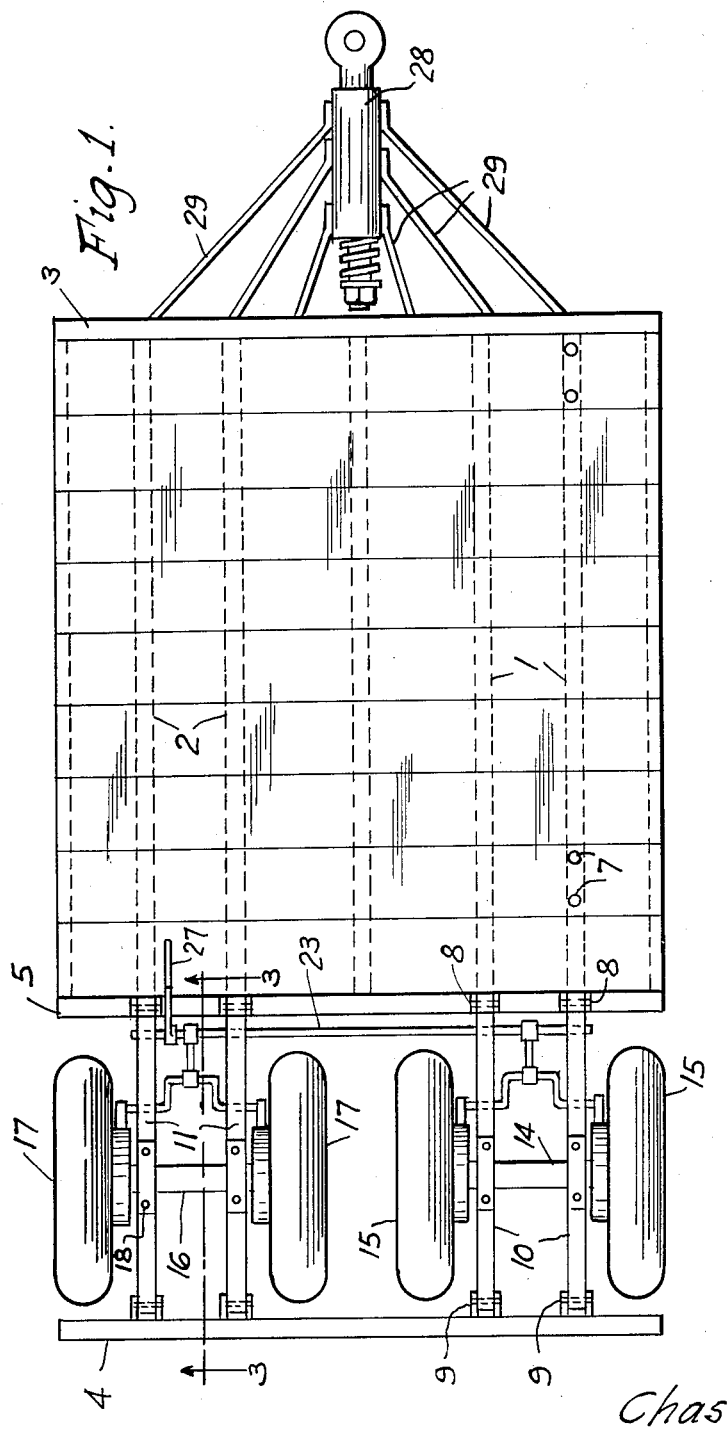
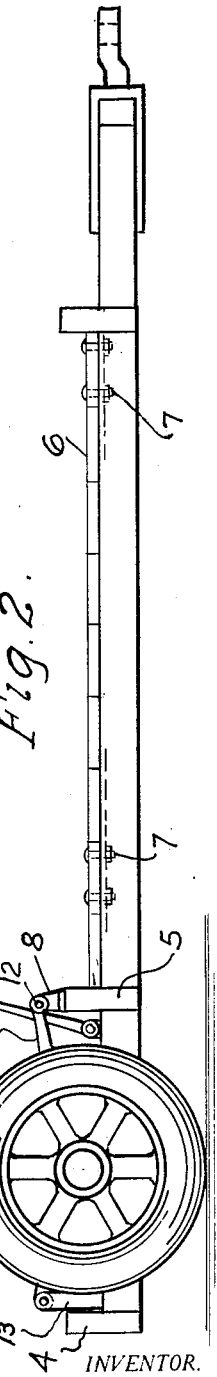
INVENTOR.
Chas. V. Hallenbeck
BY Watson E. Coleman
ATTORNEY.

Dec. 5, 1933.   C. V. HALLENBECK   1,938,142
TRAILER
Filed Nov. 24, 1931   3 Sheets-Sheet 2
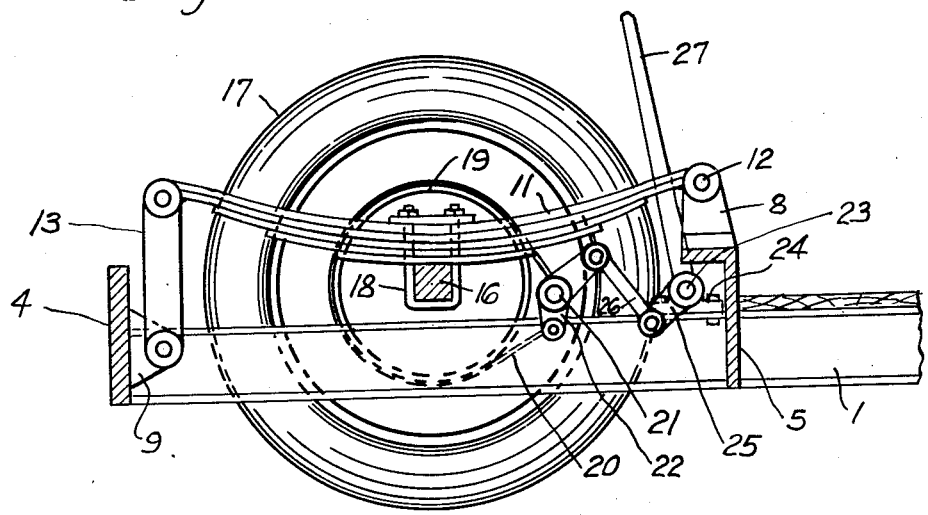
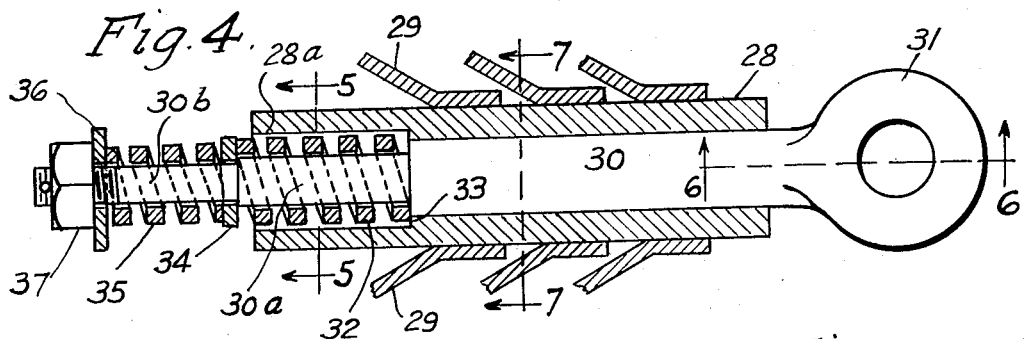
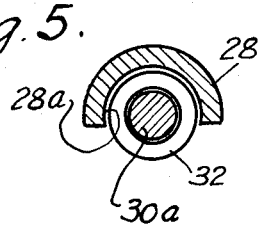
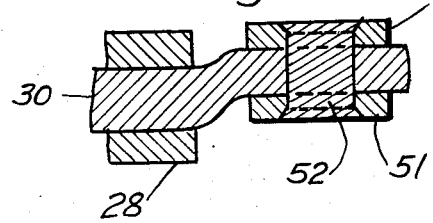
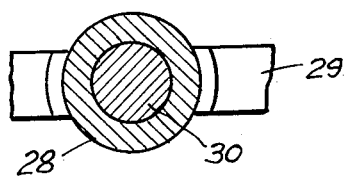
INVENTOR.
Chas. V. Hallenbeck
BY Watson E. Coleman
ATTORNEY.

Dec. 5, 1933.   C. V. HALLENBECK   1,938,142
TRAILER
Filed Nov. 24, 1931   3 Sheets-Sheet 3
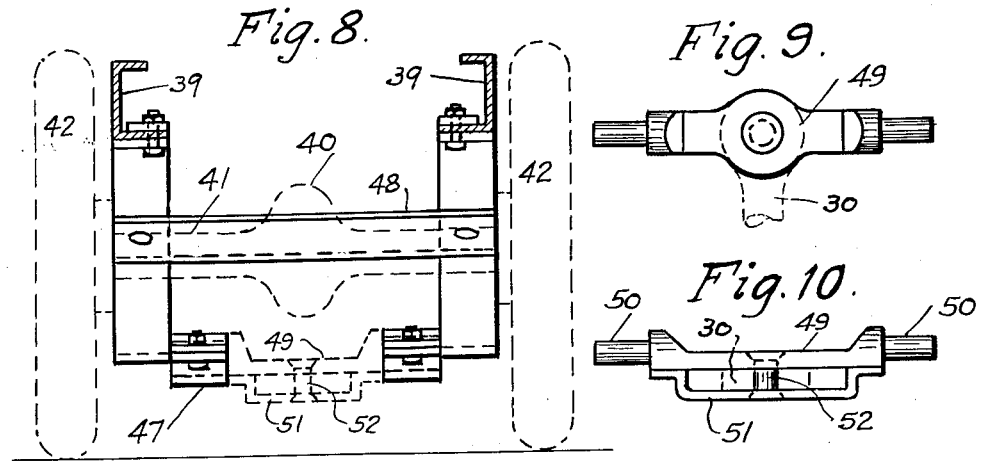
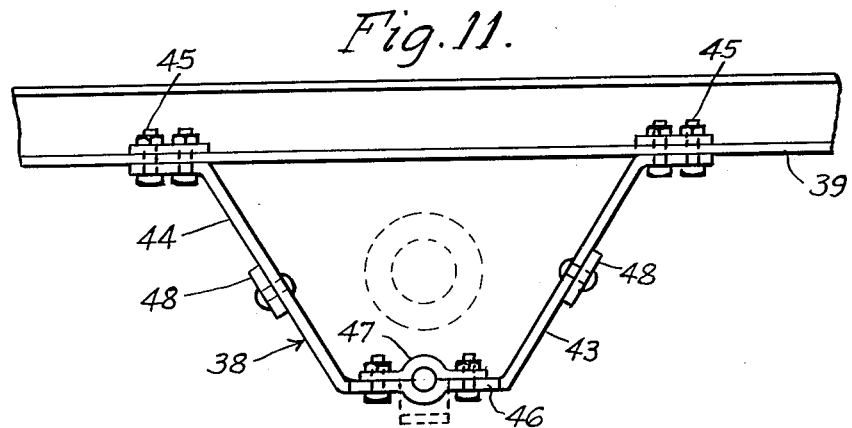
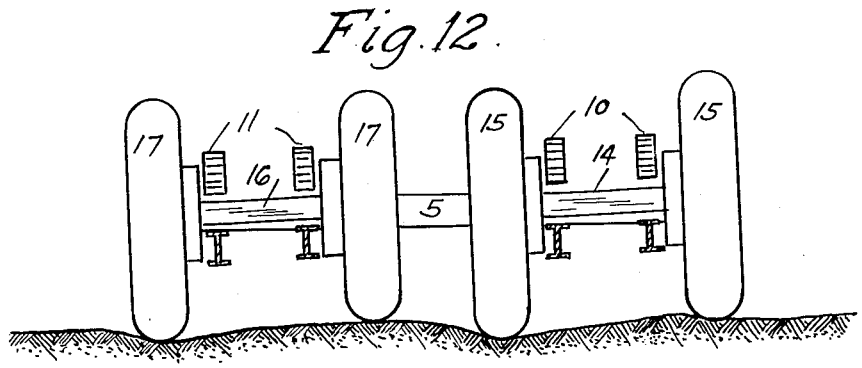
INVENTOR.
Chas. V. Hallenbeck
BY Watson E. Coleman
ATTORNEY.

Patented Dec. 5, 1933

1,938,142

UNITED STATES PATENT OFFICE 1,938,142

TRAILER

Charles V. Hallenbeck, Denver, Colo.

REISSUED

Application November 24, 1931
Serial No. 577,089

1 Claim. (Cl. 280—106.5)

This invention relates to trailers of that type designed to carry heavy loads and usually drawn by automobile trucks.

The invention has for one of its objects to provide a novel trailer of the character stated which will embody a deck carrying frame, means for effecting a four point suspension of the rear end of the frame, and means for effecting a one point suspension of the front end of the frame.

The invention has for a further object to provide a trailer of the character stated wherein the means for effecting the four point suspension will embody wheels connected in such manner to the frame that any two or more of them may adapt themselves to the irregularities of the road and coact in such manner as to take the entire load exerted at the rear portion of the frame.

The invention has for a further object to provide a trailer of the character stated wherein the wheels will be arranged in pairs and wherein the connection between the wheels and frames will be such that on the sinking of one wheel of a pair into a depression or soft ground a substantial portion of the weight borne by such wheel will be transferred to the other wheel of the pair.

The invention has for a further object to provide a trailer of the character stated wherein the means for effecting the one point suspension will be adapted to be readily secured to the frame of any automobile truck without interfering with the body of the truck and without preventing the truck from being used for the various purposes for which it was designed, the connection of this means to the truck frame transferring a substantial portion of the load of the trailer to the rear wheels of the truck and thus distributing the load of the trailer over six wheels which greatly reduces the bearing pressure on the road.

The invention has for a further object to provide a trailer of the character stated wherein the means for effecting the one point suspension will permit the trailer to turn with relation to the truck about a vertical axis and about horizontal axes longitudinally and transversely related to the trailer, to the end that the trailer may swivel, twist and turn while rounding a corner or passing over irregularities of the road.

With the foregoing and other objects in view, the nature of which will appear as the description proceeds, the invention consists in the construction, combination and arrangement of parts hereinafter fully described and claimed, and illustrated in the accompanying drawings, wherein:—

Figure 1 is a top plan view of a trailer constructed in accordance with my invention;

Figure 2 is a view in side elevation of the trailer;

Figure 3 is a sectional view on an enlarged scale taken on the vertical plane indicated by the line 3—3 of Figure 1;

Figure 4 is a sectional view on an enlarged scale taken on a plane extending horizontally and centrally through the draw bar of the trailer;

Figure 5 is a sectional view taken on the vertical plane indicated by the line 5—5 of Figure 4;

Figure 6 is a sectional view taken on the vertical plane indicated by the line 6—6 of Figure 4;

Figure 7 is a sectional view taken on the vertical plane indicated by the line 7—7 of Figure 4;

Figure 8 is a view partly in vertical section and partly in rear elevation of the means for connecting the draw bar to the frame of an automobile truck;

Figure 9 is a top plan view of the pivoted cross bar of this means;

Figure 10 is a view in rear elevation of the cross bar;

Figure 11 is a view in side elevation of a portion of the truck frame and the means by which the draw bar is connected to the frame, and Figure 12 is a view in elevation of the rear end of the trailer illustrating the manner in which the wheels effecting the four point suspension are adapted to accommodate themselves to the irregularities of a gravel or dirt road.

The trailer comprises a frame consisting of a pair of longitudinal beams 1, a pair of longitudinal beams 2, a front cross bar 3 and rear cross bars 4 and 5. The beams 1 are arranged in spaced relation at one side of the longitudinal center of the trailer, and the beams 2 are arranged in spaced relation at the other side of such center of the trailer. The cross bar 3 and the cross bar 4 are secured to the front and rear ends, respectively, of the beams 1 and 2, and the cross bar 5 is secured to the beams rearwardly of the transverse center of the trailer and in comparatively close relation to the cross bar 4.

Oak flooring 6 is secured by bolts 7 to the beams 1 and 2 between the cross bars 3 and 5 to provide a deck for the trailer. Brackets 8 are secured to and extend upwardly from the cross bar 5, and brackets 9 are secured to and extend forwardly from the cross bar 4. The brackets 8 and 9 are located close to the beams 1 and 2, and the brackets 8 are located in planes above the brackets 9. Pairs of leaf springs 10 and 11, preferably of the semi-eliptic type, have their front ends pivotally connected, as at 12, to the upper ends of the brackets 8, and have their rear ends connected by links 13 to the brackets 9. The springs 10 rest upon an axle 14 supported by pneumatically tired wheels 15, and the springs 11 rest upon an axle 16 supported by pneumatically tired wheels 17. The springs 10 and 11 are secured to the axles 14 and 16 by clips 18. The axles 14 and 16 are held against rotation and the wheels 15 and 17 are rotatably mounted thereon. The springs 10 and 11, the axles 14 and 16, and the wheels 15 and 17 constitute the means for effecting the four point suspension of the rear end of the trailer.

Brakes are provided for the wheels 15 and 17. The brakes comprise drums 19 secured to the wheels, bands 20 passing about the drums, and crank shafts 21 connected to certain ends of the bands and having arms 22 connected to the other ends of the bands. A shaft 23 located forwardly and transversely of the wheels 15 and 17, is journaled in bearings 24 secured to the beams 1 and 2, and is provided with arms 25 connected by links 26 to the cranks of the shafts 21. A hand lever 27 fixed to and extending upwardly from the shaft 23 provides means through the medium of which the shaft may be turned to apply or release the brakes.

The means for effecting the one point suspension of the trailer comprises a sleeve 28 which extends forwardly from the front end of the trailer and which is secured thereto by bars 29. The bars 29 converge forwardly from the beams 1 and 2 and are secured to the sides of the sleeve 28. A draw bar 30 is slidably and rotatably mounted in the sleeve 28, and is provided at its front end with an eye 31. The rear end portion of the sleeve 28 is radially enlarged interiorly, as at 28a, and a portion of the draw bar 30 is reduced diametrically, as at 30a. Rearwardly of its portion 30a, the draw bar 30 is again reduced diametrically, as at 30b. A coil spring 32 is sleeved on the draw bar portion 30a and bears against the shoulder 33 formed by enlarging the rear end portion of the sleeve 28 and against a washer 34 mounted upon the draw bar and bearing against the shoulder provided during the formation of the draw bar portion 30b. A coil spring 35 of less power than the spring 32 is sleeved on the draw bar portion 30b between the washer 34 and a washer 36 secured on this draw bar portion by a nut 37.

The means for effecting the one point suspension of the trailer also comprises a coupling which includes brackets 38 adapted to be secured to the side bars of the frame of any automobile truck. Portions of two of such bars are shown in Figures 8 and 11 and are designated 39. Figure 8 also shows in dotted lines the differential housing 40, the axle housings 41 and the rear wheel 42 of the truck. The brackets 38 comprise front arms 43 and rear arms 44 which are secured, as at 45, to the frame bars 39. The arms 43 and 44 of each of the brackets 38 converge downwardly, and are connected at their lower ends by bars 46 provided with bearings 47. The arms 43 and 44 are arranged forwardly and rearwardly of the axle housings 41, and the bars 46 are located below the axle housings.

The brackets 38 are connected by bars 48 which hold them against any relative lateral movement. A shaft 49 located between the bearings 47, is terminally provided with trunnions 50 journaled in the bearings, and is provided at its lower side with a yoke 51. The eye 31 of the draw bar 30 is positioned between the shaft 49 and its yoke 51, and a vertical pivot 52 carried by the shaft and yoke passes through the eye to connect the draw bar to the coupling.

From the foregoing description, taken in connection with the accompanying drawings, it will be apparent that the trailer body, consisting of the beams 1 and 2 and the deck 6, has its rear end suspended from the ground at four points and has its front end suspended from the automobile truck at one point.

As the wheels 15 and 17 are connected to the trailer body by the springs 10 and 11, and as one pair of these wheels may move vertically with relation to the other pair, the wheels will readily adapt themselves to the irregularities of the road and coact in such way as to take the entire load exerted at the rear portion of the body. Furthermore, should one wheel of one or both pairs thereof sink into a depression or soft ground, the greater portion of the weight borne by such wheel or wheels will be transferred to the wheels remaining on the higher or more solid ground. This especially adapts the trailer for easy movement over lots, fields and unpaved roads. As the pair of wheels 15 and 17 are arranged at opposite sides of the longitudinal center of the body of the trailer, as the draw bar 30 is located at the front end of the body in alinement with such center, and as the body may turn about the draw bar, the trailer may twist or rock about its longitudinal center while moving over irregularities of the road, lot, field or the like. The shaft 49 of the coupling extends transversely of the automobile truck, and is suspended from the frame of the truck for rocking movement about a horizontal axis so that the trailer and truck may move upwardly and downwardly independently of each other as they encounter irregularities of the road. As the draw bar 30 is connected to the coupling shaft 49 for movement about a vertical axis, the trailer will readily turn with relation to the truck when rounding a corner. The connection of the coupling to the frame of the automobile truck interposes the rear springs of the truck between the trailer and ground, and due thereto the one point suspension means is of the yielding type.

Furthermore, this means also includes the rear wheels of the automobile truck, and as the result provides the trailer body suspending means with six wheels, four at the rear end of the body and two at the front end thereof, and transfers a substantial portion of the load of the trailer to the truck. The springs 32 and 34 establish a yielding connection between the trailer and truck. This means and the connection of the trailer to the frame of the truck prevents undue strain on the propelling mechanism of the truck especially during the starting of the truck. The four point rear suspension means, and the one point front suspension means, adapts the trailer for transporting heavy loads at the expenditure of comparatively little power and with no liability of the load becoming accidentally displaced from the trailer. If desired, clamps of any well-known construction, not shown, may be used to secure the coupling brackets 38 to the truck frame bars 39 so as to avoid the necessity of boring bolt receiving openings in the frame bars.

While I have described the principle of the invention, together with the structure which I now consider the preferred embodiment thereof, it is to be understood that the structure shown is merely illustrative and that such changes may be made, when desired, as fall within the scope of the invention as claimed.

What is claimed is:—

A trailer for an automobile truck, comprising a body including pairs of beams located at opposite sides of the longitudinal center thereof, rear cross bars secured to the beams, brackets secured to the foremost of the cross bars, other brackets secured to the rearmost of the cross bars in planes below said first brackets, arcuate springs pivotally connected at their front ends to said first brackets, links connected to the rear ends of the springs and to said second brackets, the springs being arranged in pairs and the respective pairs of springs being located at opposite sides of the longitudinal center of the body, an axle secured to the underside of each pair of springs, wheels journaled on each axle, and means for suspending the front end of the body at one point from the truck and in alinement with the longitudinal center thereof.

CHARLES V. HALLENBECK.